United States Patent
Song et al.

(10) Patent No.: US 8,535,823 B2
(45) Date of Patent: Sep. 17, 2013

(54) COOLING DEVICE OF BATTERY PACK

(75) Inventors: Tae-won Song, Yongin-si (KR); Tae-sang Park, Suwon-si (KR); Duk-jin Oh, Seoul (KR); Ji-young Jeong, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 594 days.

(21) Appl. No.: 12/625,756

(22) Filed: Nov. 25, 2009

(65) Prior Publication Data

US 2010/0136406 A1 Jun. 3, 2010

(30) Foreign Application Priority Data

Dec. 2, 2008 (KR) ........................ 10-2008-0121284

(51) Int. Cl.
*H01M 10/50* (2006.01)
*H05K 7/20* (2006.01)

(52) U.S. Cl.
USPC ................. 429/120; 429/71; 429/72; 429/82; 429/62; 361/697; 361/274.2; 361/674; 361/688

(58) Field of Classification Search
USPC ........... 429/53, 62, 71, 120, 72, 82; 361/697, 361/274.2, 674, 688
See application file for complete search history.

(56) References Cited

U.S. PATENT DOCUMENTS

| 5,015,545 | A | 5/1991 | Brooks |
| 6,255,015 | B1 * | 7/2001 | Corrigan et al. ............... 429/149 |
| 6,455,186 | B1 * | 9/2002 | Moores et al. ................... 429/71 |
| 2002/0028376 | A1 * | 3/2002 | Yamane et al. ............... 429/120 |
| 2004/0180257 | A1 * | 9/2004 | Kimoto ......................... 429/120 |
| 2006/0110657 | A1 * | 5/2006 | Stanton et al. ................ 429/120 |
| 2007/0015049 | A1 | 1/2007 | Hamada et al. |
| 2007/0020513 | A1 * | 1/2007 | Medina et al. ............... 429/120 |
| 2008/0305388 | A1 * | 12/2008 | Haussman .................... 429/120 |
| 2009/0317697 | A1 * | 12/2009 | Dogariu et al. ................. 429/62 |

FOREIGN PATENT DOCUMENTS

| JP | 61-243662 | 10/1986 |
| JP | 63-48772 | 3/1988 |
| JP | 11-329518 | 11/1999 |
| JP | 2007-95483 | 4/2007 |
| JP | 2007-0117841 | 12/2007 |

* cited by examiner

*Primary Examiner* — Patrick Ryan
*Assistant Examiner* — Alex Usyatinsky
(74) *Attorney, Agent, or Firm* — Cantor Colburn LLP

(57) ABSTRACT

A battery pack including battery cells, a housing to house the battery cells, and a cooling device that cools air flowing through the housing. The cooling device may be installed on an intermediate portion of the housing. The cooling device may include a cooling pipe, in which water flows.

3 Claims, 6 Drawing Sheets

COOLING DEVICE OF BATTERY PACK

CROSS-REFERENCE TO RELATED APPLICATION

This application claims the benefit of Korean Patent Application No. 10-2008-0121284, filed on Dec. 2, 2008, in the Korean Intellectual Property Office, the disclosure of which is incorporated herein, by reference.

BACKGROUND

1. Field

Exemplary embodiments of the present teachings relate to a cooling device of a battery pack, and more particularly, to a battery pack including a cooling device that reduces temperature variations in the battery pack.

2. Description of the Related Art

A battery pack includes a battery module having a plurality of battery cells and a housing surrounding the battery module. Battery cells used in hybrid cars or electric cars are mainly lithium (Li)-ion batteries, which have a higher energy density than nickel metal hydride (Ni-MH) batteries.

Electro-chemical reactions occur in the battery cells, in order to store and release electricity, and such reactions generate heat as a byproduct. If the temperature of the housing exceeds about 100° C., the performance of the battery may be degraded. Therefore, a cooling device is generally installed in the housing.

In general, the cooling device draws air into the housing through an inlet, which is then discharged through an outlet of the housing. The temperature of the air gradually increases as the air approaches the outlet, as the air absorbs heat from the battery cells. The temperature variation in the housing may reduce the performance and lifespan of the battery pack.

SUMMARY

Exemplary embodiments of the present teachings include a battery pack including a housing and a cooling device provided at an intermediate portion of a housing, to discharge heat from the housing.

Exemplary embodiments of the present teachings may include a battery pack including: a plurality of battery cells; a housing surrounding the battery cells, having an inlet and an outlet formed on opposing ends thereof, through which air enters and exits the housing to cool the battery pack; and a cooling device to cool the air in the housing.

According to various embodiments, the cooling device may include: a cooling pipe through which water flows, to absorb heat from the air; a water pump to pump the water through the cooling pipe; and a storage tank connected to the cooling pipe, to store the water.

According to various embodiments, the housing may include a front portion to which the inlet is connected, a rear portion to which the outlet is connected, and an intermediate portion disposed between the front portion and the rear portion. The cooling device is installed at the intermediate portion. The cross-sectional area of the intermediate portion may be smaller than the cross-sectional area of the front portion.

According to various embodiments, the cooling device may be a thermoelectric cooler including a cold junction disposed in the housing, and hot junctions disposed outside of the housing.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects of the present teachings will become apparent and more readily appreciated from the following description of the exemplary embodiments, taken in conjunction with the accompanying drawings, of which.

DETAILED DESCRIPTION

Figure 1:
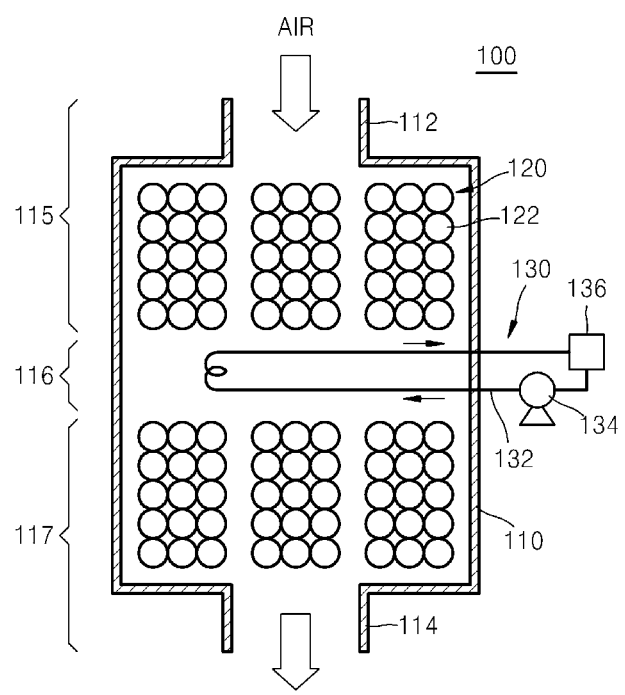
FIG. 1 is a schematic diagram of a battery pack including a cooling device, according to an exemplary embodiment.

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

FIG. 1 is a schematic diagram of a battery pack 100, according to an exemplary embodiment of the present teachings. Referring to FIG. 1, the battery pack 100 includes a housing 110 and a plurality of battery modules 120 placed in the housing 110. Each of the battery modules 120 includes a plurality of battery cells 122. The battery cells 122 may be Ni-MH batteries or Li-ion batteries, for example.

The housing 110 includes an inlet 112, through which a first cooling medium is injected, and an outlet 114, through which the first cooling medium is discharged. The first cooling medium may be air (atmospheric air). When the battery pack 100 is mounted on a hybrid or electric car, the battery pack 100 is disposed so that the inlet 112 faces a front portion of the car, and the outlet 114 faces a rear portion of the car. An additional fan (not shown) may be installed at the inlet 112 or the outlet 114, to facilitate the flow of air through the housing 110. The housing 110 includes a front portion 115, to which the inlet 112 is connected, a rear portion 117, to which the outlet 114 is connected, and an intermediate portion 116 disposed between the front portion 115 and the rear portion 117.

A cooling device 130, through which a second cooling medium flows, is installed in the housing 110, so as to contact the air flowing through the housing 110. The cooling device 130 includes a cooling pipe 132, a water pump 134 to pump the second cooling medium through cooling pipe 132, and a storage tank 136 to store the second cooling medium. The second cooling medium may be a liquid such as water. The water in the storage tank 136 may be supplied to the cooling pipe 132, through the water pump 134. Heat is absorbed from the first cooling medium by the water in the cooling pipe 132. The cooling pipe 132 may be disposed in the intermediate portion 116 of the housing 110. The cooling pipe 132 may be a coil-shaped pipe, in order to improve the cooling efficiency thereof.

Figure 2:
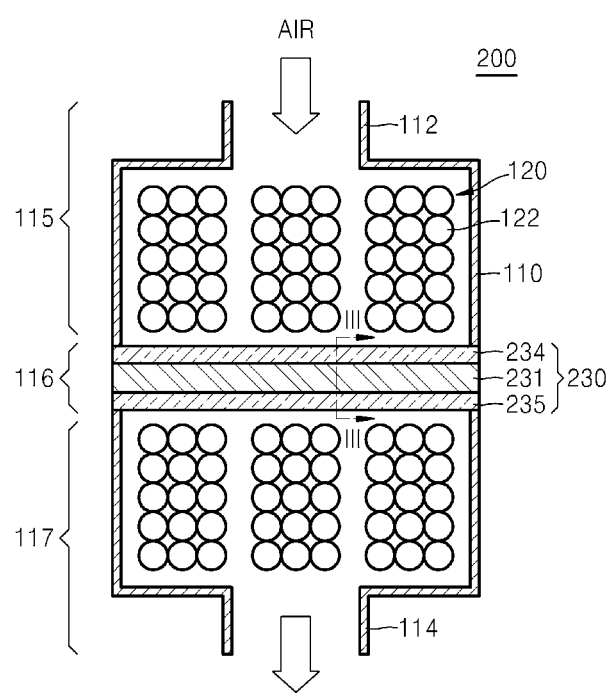
FIG. 2 is a schematic diagram of a battery pack including a cooling device, according to another exemplary embodiment.
Figure 3:
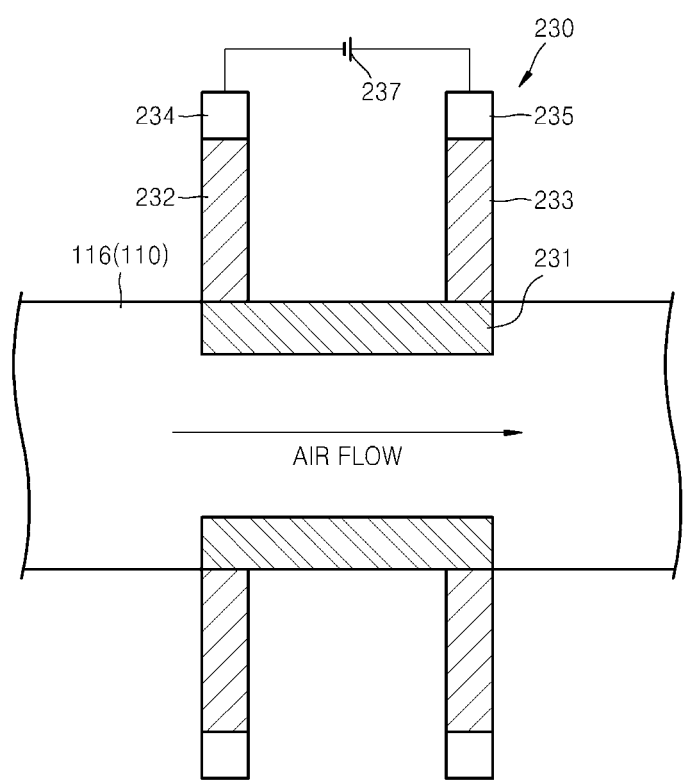
FIG. 3 is a cross-sectional view of the battery pack taken along line III-III of FIG. 2.

FIG. 2 is a schematic diagram of a battery pack 200 including a cooling device 230, according to another exemplary embodiment. FIG. 3 is a cross-sectional view of the battery pack 200, taken along line III-III of FIG. 2.

Referring to FIGS. 2 and 3, the cooling device 230 is a thermoelectric cooler that surrounds the outer circumference of the intermediate portion 116 of the housing 110. The thermoelectric cooler 230 includes a cold junction 231 installed in the housing 110 and hot junctions 234 and 235 installed on the outside of the housing 110. A p-type portion 232, which is a moving path of holes, is formed between the hot junction 234 and the cold junction 231, and an n-type portion 233, which is a moving path of electrons, is formed between the hot junction 235 and the cold junction 231. A direct current (DC) power source 237 is connected to the hot junctions 234 and 235. When a predetermined voltage is applied by the DC power source 237, heat is transferred from the cold junction 231 to the hot junctions 234 and 235. The air in the housing 110 is cooled, due to heat exchange with the thermoelectric cooler 230.

Figure 4:
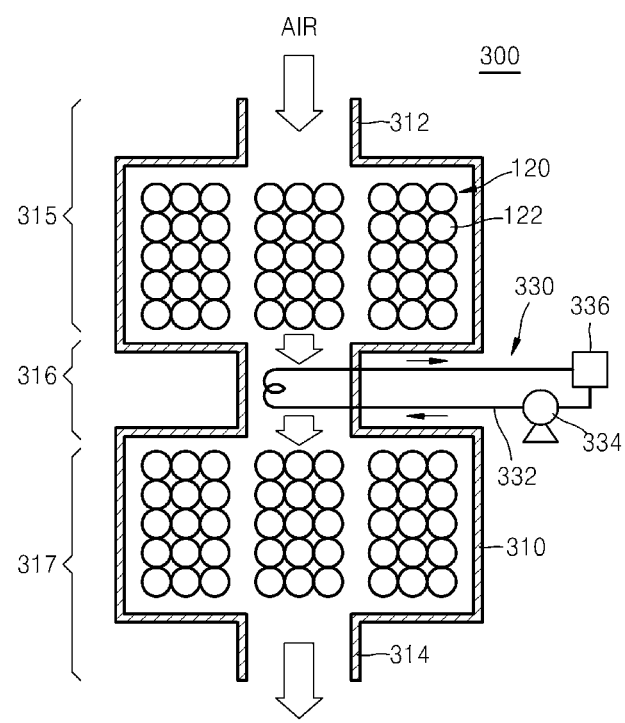
FIG. 4 is a schematic diagram of a battery pack, according to another exemplary embodiment.

FIG. 4 is a schematic diagram of a battery pack 300, according to another exemplary embodiment. Referring to FIG. 4, the battery pack 300 includes a housing 310 and a plurality of battery modules 120 placed in the housing 310. Each of the battery modules 120 includes a plurality of battery cells 122. The battery cells 122 may be Ni-MH batteries or Li-ion batteries, for example.

The housing 310 includes a front portion 315, to which an inlet 312 is connected, a rear portion 317, to which an outlet 314 is connected, and an intermediate portion 316 disposed between the front portion 315 and the rear portion 317. The cross-sectional area of the intermediate portion 316, is smaller than the cross-sectional areas of each of the front portion 315 and the rear portion 317.

A cooling device 330 is installed on the intermediate portion 316 and includes a cooling pipe 332, a water pump 334 to pump the second cooling medium through the cooling pipe 332, and a storage tank 336 to store the second cooling medium (water). The water stored in the storage tank 336 may be supplied to the cooling pipe 332, via the water pump 334. Heat is exchanged between the water and the air flowing through the housing 310. The cooling pipe 332 is formed as a coil-shaped pipe, in the intermediate portion 316 of the housing 310, to improve a cooling efficiency thereof.

Figure 5:
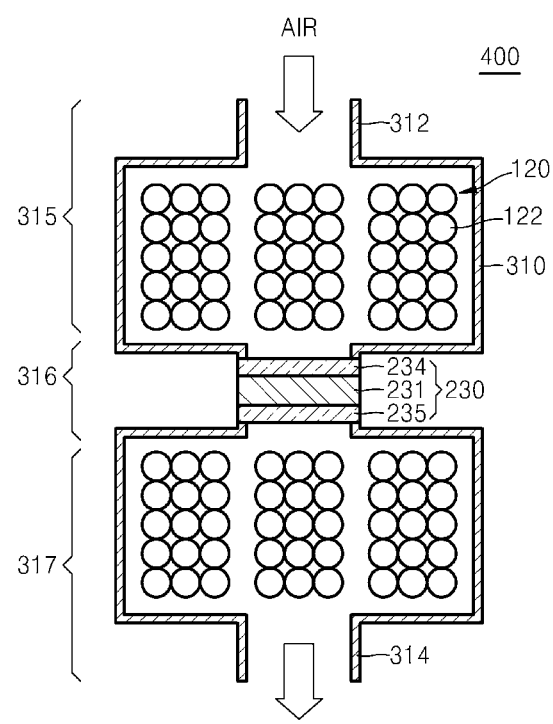
FIG. 5 is a schematic diagram of a battery pack, according to another exemplary embodiment.

FIG. 5 is a schematic diagram of a battery pack 400, according to another exemplary embodiment. Elements similar to those of FIG. 4 are not described in detail. Referring to FIG. 5, the battery pack 400 includes a thermoelectric cooler 230 that surrounds the outer circumference of the intermediate portion 316 of the housing 310. The thermoelectric cooler 230 has the same structure as shown in FIG. 3.

Figure 6:
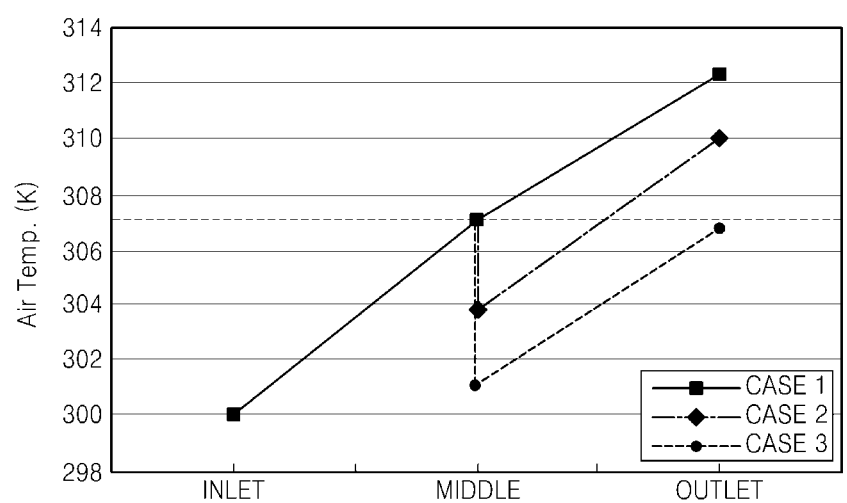
FIG. 6 is a graph showing simulation results of cooling efficiencies in battery packs including the cooling devices according to the exemplary embodiments.

FIG. 6 is a graph showing simulation results of cooling efficiencies of a related art battery pack (Case 1), the battery pack 100 (Case 2), and the battery pack 300 (Case 3). The battery cells 122 included in the battery modules 130 are Li-ion batteries having a diameter of 50 mm and a length of 118 mm, and the housings 110, 310 are formed of plastic. Each of the battery modules 130 includes 24 battery cells 122, and the front portion and the rear portion of the housings 110, 310 have a cross-sectional size of 210 mm×130 mm, respectively. Each of the battery cells 122 has a calorific value of 10 J/sec. The intermediate portion 316 of the battery pack in Case 3 has a cross-sectional size of 110 mm×65 mm. The cooling device 130 is installed on the intermediate portion of the housing 110 and includes a plurality of cooling pipes arranged in parallel with a longitudinal direction of the battery cells. The temperature of the air, that is, the first cooling medium, is 300 K, and the temperature of the water, that is, the secondary cooling medium, is 270 K.

Referring to FIG. 6, the temperature of the air passing through the housing of the general battery pack increases by about 12° C. In Case 2, the temperature in the front portion 115 is the same as that of Case 1, the temperature of the air is reduced by about 3° C. in the intermediate portion 116, and the temperature of the outlet 114 is reduced by about 2° C., as compared to Case 1. In Case 3, the temperature in the front portion 315 is the same as that of Case 1, the temperature of the air is reduced by about 6° C. in the intermediate portion 316, and the temperature of the outlet 314 is reduced by about 6° C., as compared to Case 1.

A battery pack including a cooling device, according to various embodiments of the present teachings, may reduce a temperature variation in a housing. Accordingly, the performance and lifespan of the battery pack is improved.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A battery pack comprising:
   battery cells;
   a housing to house the battery cells;
   an inlet formed on a front portion of the housing, through which air is injected to cool the battery cells;
   an outlet formed on an opposing rear portion of the housing, through which the air is discharged; and
   a cooling device disposed at an intermediate portion inside the housing to contact the injected air inside the housing and to cool the injected air inside the housing,
   wherein the cooling device comprises:
   a cooling pipe through which a fluid flows, to absorb heat from the injected air inside the housing;
   a pump to pump the fluid through the cooling pipe; and
   a storage tank connected to the cooling pipe, to store the fluid.

2. The battery pack of claim 1, wherein:
   the cooling device is disposed at the intermediate portion of the housing between the front portion having at least one battery and the rear portion having at least one battery.

3. The battery pack of claim 2, wherein the cross-sectional area of the intermediate portion is smaller than the cross-sectional area of the front portion.

* * * * *